United States Patent [19]
Knepper et al.

[11] Patent Number: 5,150,829
[45] Date of Patent: Sep. 29, 1992

[54] APPARATUS FOR HOLDING SAMPLES DURING SOLDERABILITY TESTING

[75] Inventors: Jonathan D. Knepper, Salisbury Township, Lehigh County; Kenneth P. Moll, Philipsburg, both of Pa.

[73] Assignee: AT&T Bell Laboratories, Murray Hill, N.J.

[21] Appl. No.: 630,465

[22] Filed: Dec. 19, 1990

[51] Int. Cl.⁵ ............................................. B23K 31/12
[52] U.S. Cl. ..................................... 228/104; 228/12; 269/254 CS
[58] Field of Search ............... 228/12, 40, 104, 103; 118/425, 503; 269/254 CS, 63, 64, 67, 69

[56] References Cited

U.S. PATENT DOCUMENTS

| | | | |
|---|---|---|---|
| 2,038,043 | 4/1936 | Hasselblad | 24/253 |
| 2,225,028 | 12/1940 | Banks | 269/254 CS |
| 2,270,177 | 1/1942 | Vawryk | 118/503 |
| 2,454,857 | 5/1945 | Bish | 248/101 |
| 2,631,282 | 3/1953 | Lindquist | 269/254 CS |
| 2,964,007 | 2/1956 | Buffington | 113/126 |
| 3,312,434 | 4/1967 | Simon | 248/62 |
| 3,914,828 | 10/1975 | Noda | 24/250 |
| 4,411,050 | 10/1983 | Couture | 24/234 |
| 4,821,393 | 4/1989 | Spigarelli | 269/254 CS |
| 4,962,905 | 10/1990 | Friend et al. | 248/125 |

FOREIGN PATENT DOCUMENTS 642314 5/1928 France .

Primary Examiner—Richard K. Seidel
Assistant Examiner—James Miner
Attorney, Agent, or Firm—J. T. Rehberg

[57] ABSTRACT

An apparatus is provided for use with a solderability testing machine to releasably engage a sample for immersion into a solder bath. The apparatus contains a pair of spring-loaded plates which serve to hold the sample so that only the desired portion of the sample may be dipped in the solder. The apparatus also carries a threaded, depth-controlling member which may be threadedly adjusted to precisely control the depth of immersion of the sample held by the holder into the sample bath.

13 Claims, 3 Drawing Sheets

APPARATUS FOR HOLDING SAMPLES DURING SOLDERABILITY TESTING

TECHNICAL FIELD

This invention generally relates to an apparatus for holding an electronic component, or a piece of circuit board, during solderability testing.

BACKGROUND OF THE INVENTION

At the present time, soldering remains the preferred method for attaching each conductive member (e.g., a lead or termination) of an electronic component. Currently, there is a trend towards smaller electronic components which have reduced-size conductive members and a corresponding reduction in the size of the metallized regions on the printed circuit board to which such conductive members are soldered. Reducing the size of the component's conductive members and the size of the metallized regions on the circuit board reduces the area of contact between each conductive member and the circuit board, making it increasingly necessary to achieve a high-quality solder joint between them.

An important criterion in achieving a high-quality solder joint between each conductive member of the component and the corresponding metallized region on the circuit board is the solderability of the conductive member and metallized region. The solderability of the conductive members of the component and the metallized region on the circuit board is determined by the extent to which solder "wets" them (i.e., the extent to which the solder adheres to them). For this reason, sample lots of components and circuit boards are commonly tested to determine their solderability.

In the past, the solderability of sample lots of components has been evaluated by fluxing the samples and then immersing them in a bath of molten solder. After immersion, the sample is withdrawn and then visually inspected to determine the extent to which solder has wetted it. As may be appreciated, this technique for evaluating solderability is highly subjective and offers no accurate mechanism for discerning small variations in the solderability of identical samples.

Recently, testers have been developed for objectively measuring solderability in accordance with the wetting force of solder on the sample. Upon immersion of the fluxed sample into the molten solder bath, the solder wets the metallic portions of the sample (e.g., the leads of the component). As the solder wets the metallic portions of the sample, the sample is subjected to a wetting force which overcomes the buoyancy force opposing immersion of the sample into the bath. By the same token, the wetting force of the solder on the sample increases the amount of force required to withdraw the sample once it has been immersed. By measuring the wetting force on the sample during immersion into, and withdrawal from, the solder bath, an accurate measure of the solderability of the sample can be obtained.

Present day solderability testers typically employ a linear variable differential transformer (LVDT) to measure the wetting force of solder on a sample. In practice, an "alligator"-type clip is used to secure the sample to the LVDT so that the sample overlies a bath of molten solder held in a heated pot. The pot is driven upwards and downwards to and from the sample by a stepper motor so that the sample can be immersed into, and withdrawn from, the solder bath. As the sample is immersed into, and withdrawn from, the solder bath, the LVDT measures the wetting force on the sample, thereby providing an indication of its solderability.

A disadvantage of the above-described solderability testers is that the alligator clip used to secure the sample to the LVDT usually cannot accommodate very small samples. Further, the prior art alligator clip, by its very design, often contributes to inaccurate solderability measurement as a result of its inability to hold certain types of samples such that only a limited part of its metallic portion is immersed into a bath of solder in a vertical manner. Depending on the geometry of the sample, only a small part of its metallic portion is ultimately soldered during assembly. This is particularly true with those surface-mounted electronic components which have an accuate toe at the lowermost end of their conductive members. Only the lower portion of the toe is ultimately soldered to a metallized region on the circuit board. Since only the lower portion of the toe, especially its bottom surface, is ultimately soldered, its solderability (rather than the solderability of the rest of the conductive member) is really of concern. With an alligator clip, it is usually impossible to hold the sample so that only the toe of the conductive member may be immersed to obtain an exact solderability measurement.

Present day IC packages can have special features (bumpers) molded into the corners of the body to protect the leads during handling. These bumpers make it impossible to measure solderability of these components by vertically dipping the leads in the solder using an alligator type clip. The bumpers adversely affect the force measurements by contributing a large nonwetting force which overshadows the wetting force contributed by the terminations.

Furthermore, present clips or holders often tend to become unbalanced when loaded with a sample, thereby adversely affecting force measurements. Thus, there is a need for an improved clip or holder for securing a component.

SUMMARY OF THE INVENTION

The present invention illustratively provides an apparatus for holding samples and a method of using them. The apparatus illustratively includes:
 a rod;
 a spring circumscribing said rod;
 a first plate member generally perpendicular to a first end of said rod;
 a second plate member parallel to said first plate member,
whereby said spring, when compressed urges said first plate member toward said second plate member.

Illustratively, the plates of the present invention permit the dipping of the sample into the solder bath so that the desired portion of the toe is completely wetted. Further embodiments contain a rod dimensioned to insert into a corresponding hole in the solderability testing machine. At least one additional transverse rod fits into a corresponding slot in the machine and prevents unbalancing.

DETAILED DESCRIPTION

Figure 1:
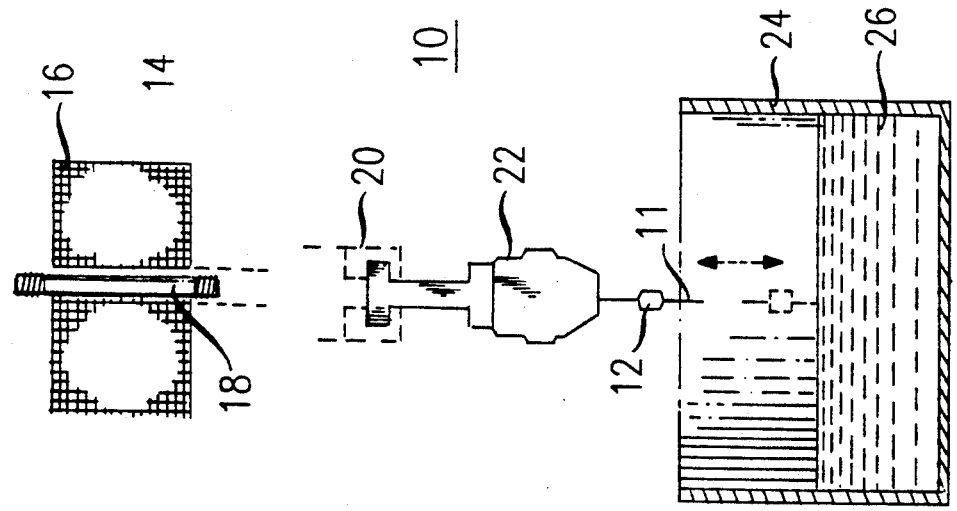
FIG. 1 is a front view, in cross section, of a solderability tester according to the prior art.

FIG. 1 is a front view, in cross-section, of a prior art solderability tester 10, of the type commercially available, for testing the solderability of a metallic portion 11 (i.e., a conductive member) on a sample 12, typically an electronic component. The tester 10 includes a force-sensing mechanism 14 in the form of a linear variable differential transformer (LVDT) comprised of an annular winding 16 rigidly secured to a support (not shown). A spring-biased magnetic core 18 is mounted for reciprocal movement in a vertical direction through the center of the winding 16. When the winding 16 is electrically energized, vertical movement of the core 18 through it causes a change in the signal in the winding, the extent of the change in the signal depending on the extent of the core movement.

The core 18 depends below the winding 16 and is provided with a hanger 20 at its lower end (typically taking the form of a strip of metal having a pair of spaced-apart tabs at its lower end, each bent in a "U" shape) for engaging a sample holder 22. The sample holder 22 is adapted to hold the sample 12, which has been fluxed, so that the fluxed sample may be immersed into, and thereafter withdrawn from, a pot 24 containing a bath 26 of molten solder. The pot 24 is displaced vertically, by way of a stepping motor (not shown), to and from the sample holder 22 so that at least part of the metallic portion 11 of the sample 12 held by the holder will be immersed into, and thereafter withdrawn from, the solder bath 26.

Figure 2:
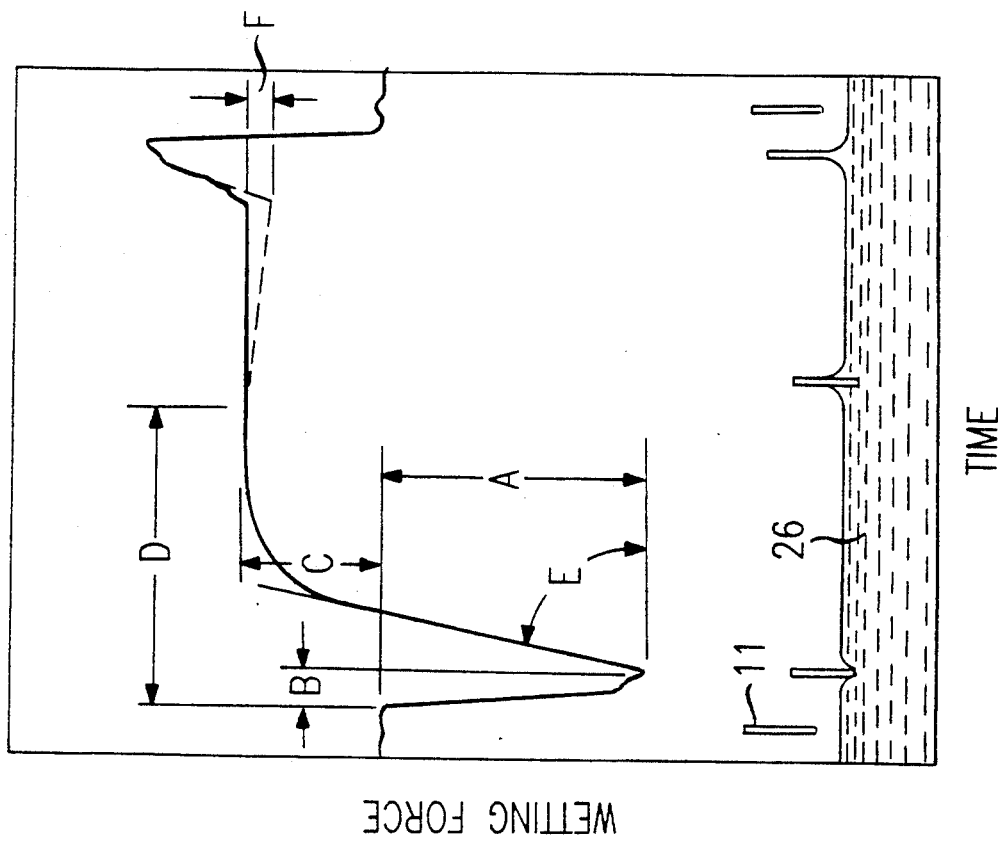
FIG. 2 shows a curve of the wetting force versus time as a sample is immersed in, and withdrawn from, a molten solder bath by the solderability tester of FIG. 1.

When immersed in the solder bath 26, the sample 12 experiences a wetting force as the solder wets the metallic portion 11 of the sample. Referring to FIG. 2, the upper plot shows the wetting force on the sample 12 during immersion into, and withdrawal from, the solder bath 26 over time. The lower plot represents the physical position of the metallic portion 11 of the sample relative to the solder bath 26 over time. The letters A, B, C, D, E and F in the upper plot of FIG. 2 represent: (A) the buoyancy force, (B) the time to begin wetting, (C) the maximum wetting force, (D) the time for maximum wetting, (E) the wetting rate (the tangent of the angle (E)), and (F) the amount of dewetting. By analyzing the upper plot of FIG. 2, the solderability of the metallic portion of the sample 12 held by the sample holder 22 can be accurately determined.

Figure 3:
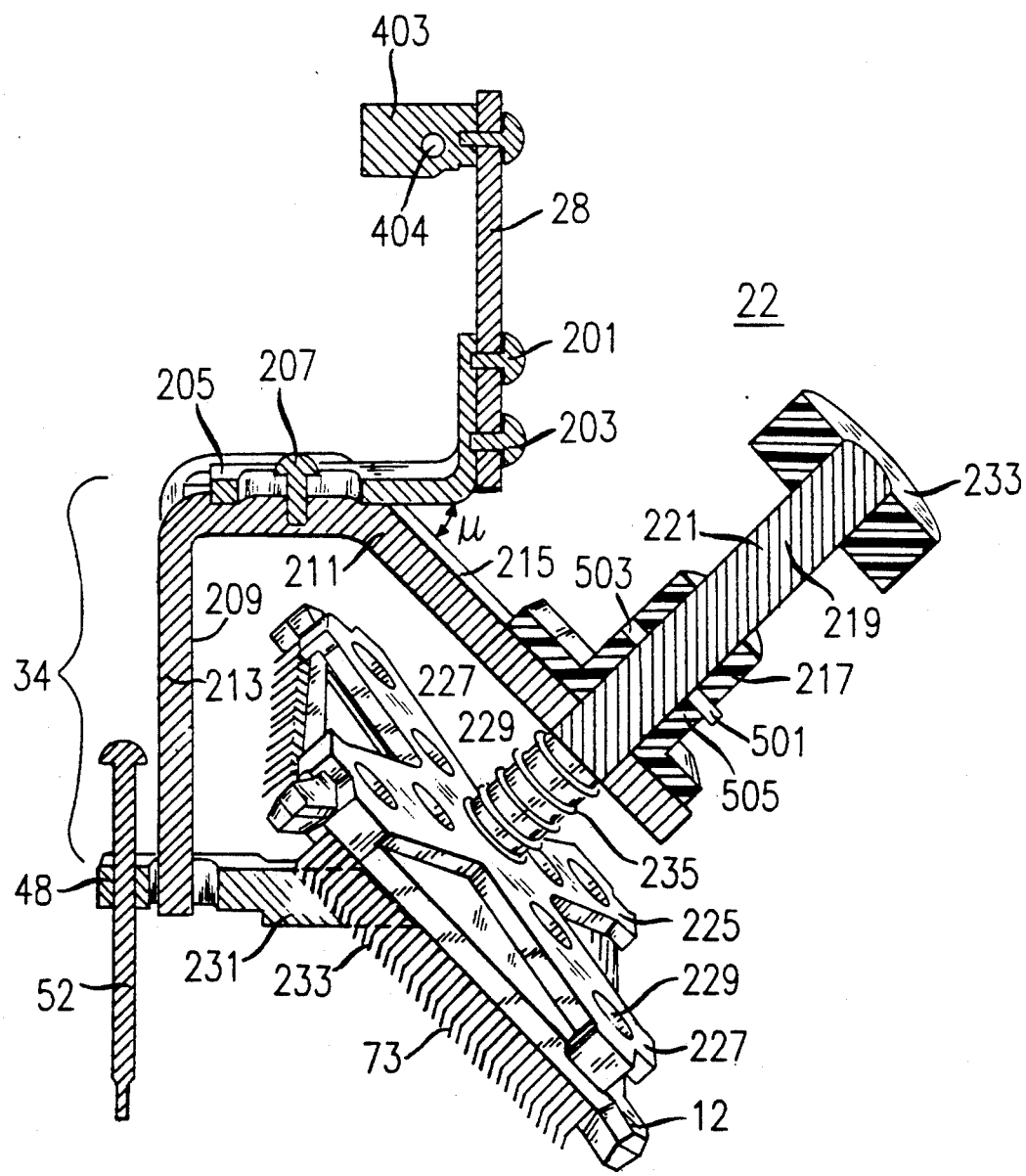
FIG. 3 is a perspective view of an illustrative embodiment of a solderability sample holder for the solderability tester of FIG. 1.

FIG. 3 contains an illustrative embodiment of the present invention. Sample holder 22 contains downward hanging flat beam 28. Beam 28 may be made, from a lightweight metal, such as aluminum, which is resistant to the solder bath such as 26 of FIG. 1. Fasteners 201 and 203 connect beam 28 to clamping mechanism 34. Right angle bar 205 is connected to beam 28 via fasteners 201 and 203. Depending from right angle bar 205 and connected to it by adjustable fastener 207 is frame 209.

Frame 209, an integral piece of metal such as aluminum, has a generally horizontal portion 211 which, as already mentioned, is connected to right angle bar 205. Depending from horizontal portion 211 of frame 209 is vertical portion 213 and slanted portion 215. Slanted portion 215 depends at an angle which is chosen so that only the arcuate toe 73 of package 12 is immersed within the solder bath. Attached to bar 215 is collar 217 which may be made illustratively from plastic. Extending through collar 217 and hole 219 in bar 215 is rod 221. Knob 223 caps rod 221.

A plate, having four arms in a generally "X" shape, 225 depends from rod 221 and covers the top of sample 12. Sample 12 is held by plate 225 via four fingers 227 which grasp each of the four corners of sample 12. Holes 229 serve to reduce the weight of plate 225. Sample 12 is further secured by horizontal bar 231 which contacts the underside of sample 12. The end 233 of horizontal bar 231 is beveled to form a plate which is generally parallel to plate 225. Consequently, sample 12 is held between plate 233 and plate 225. Spring 235 serves to urge plate 225 towards plate 233, thus insuring secure holding of sample 12.

The embodiment of FIG. 3 permits the testing of arcuate leads such as 73 on all four sides of package 12 without removal from sample holder 22. As depicted in FIG. 3, lead 73 on side 251 of package 12 may be tested in the present configuration. Leads on side 253 may be tested by pulling upward on knob 223 and then rotating rod 221 to bring side 253 into the lowermost portion. Knob 223 may then be released, thus permitting sample 12 to descend and securely contact bevel 233. Rod 501 fits into one of the holes 503 or 505 (or possibly two other holes at 90° from those) to secure the position of sample 12.

Plate 227 is attached to rod 221 by a screw not shown. Thus various plates of different sizes (corresponding to different sample sizes) may be employed.

Integral with horizontal bar 231 is projection 48 which extends horizontally outward opposite package 12. Screw 52 is threaded vertically through a hole in projection 48. Extending from the base of screw 52 is wire 53 made from a non-solder wetting material such as molybdenum or steel (stainless). By threading screw 52 into or out of projection 48, wire 53 can be raised or lowered.

When the sample holder 22 of FIG. 3 is employed with a solderability tester, the lower tip of wire 53 contacts the solder bath as the solder pot is raised towards the sample to immerse the sample leads in the bath. Wire 53 which is electrically conductive, but non-wettable, will make electrical contact with the solder bath as the sample 12 is immersed.

Since the frame 209 of the sample holder is also conductive, an electrical circuit between sample holder 22 and solder bath is completed. By monitoring when the electrical circuit between frame 209 and the solder bath is completed, an indication can be had as to when wire 53 contacts the bath and hence when sample 12 has been immersed to a predetermined depth.

Figure 4:
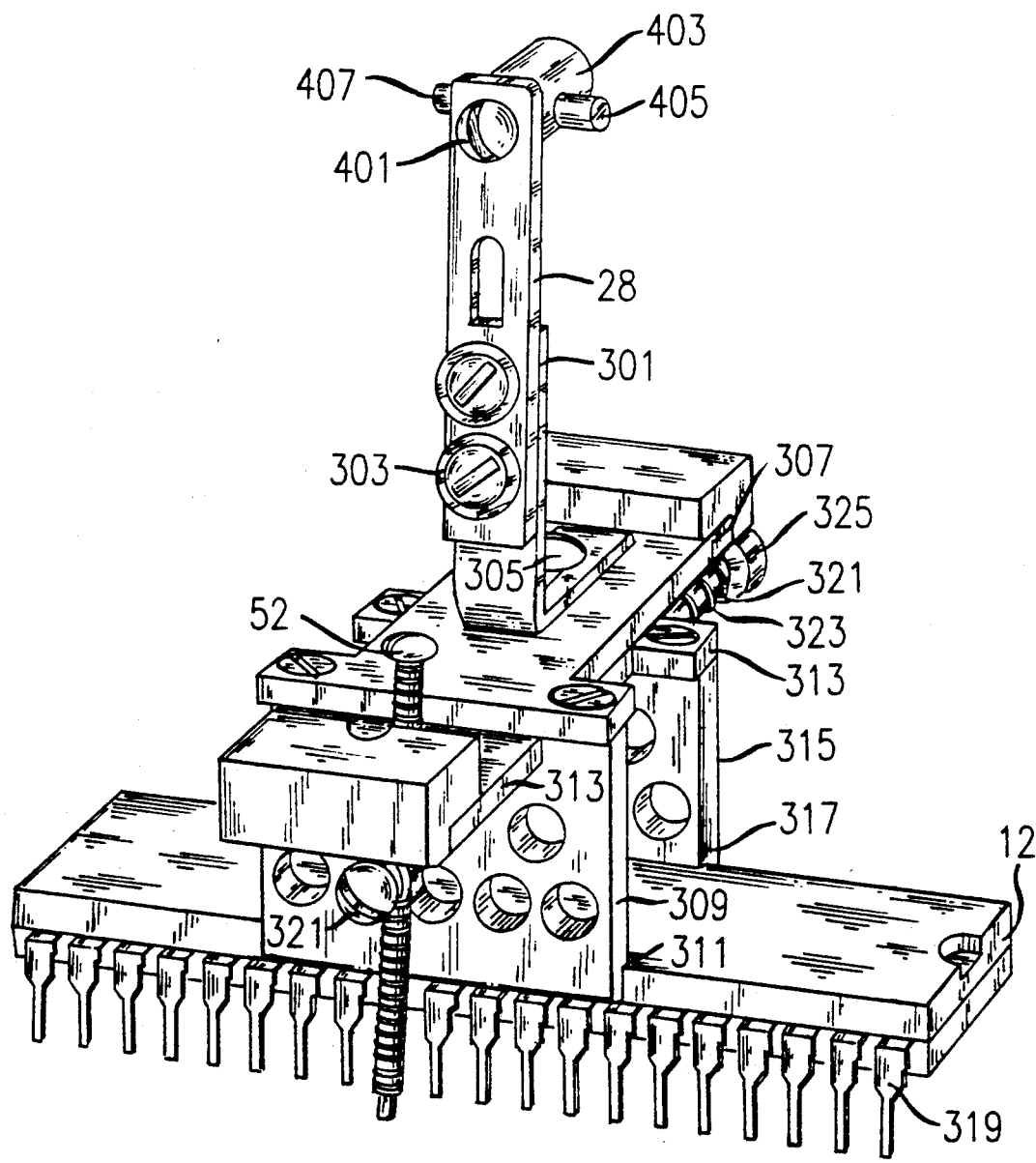
FIG. 4 is a perspective view of another embodiment for the sample holder.

FIG. 4 contains another illustrative embodiment of the present invention. Sample holder 22 contains downward-hanging flat beam 28. Beam 28 is made, as before, from a lightweight metal, such as aluminum, which is resistant to the solder bath such as 26 of FIG. 1. Fasteners 303 and 301 connect beam 28 to right angle bar 305. Depending from right angle bar 305 is plate 307. Depending from and perpendicular to plate 307 is plate 309. Plate 309 has indentation 311 which meets with the side of dual in-line package 12. Plate 309 admits another plate 313 from which perpendicularly depends plate 315. Plate 315 has a similar indentation 317 which meets with the opposite side of dual in-line package 12. Together plates 309 and 315 serve to grasp dual in-line package 12 and hold it so that leads 319 may be dipped into the solder bath.

Rod 321 protrudes through plate 309 and is fixedly mounted therein. Spring 323 circumscribes rod 321 and is compressed between plate 315 and cap 325. Spring 323 serves to urge plate 309 against plate 315 thus providing a gripping force for holding dual in-line package 12. Screw 52 extends downward through a hole in the horizontally protruding rod 321. Screw 52 provides the previously discussed depth control measurement.

Attached to beam 28, by screw 401, is rod 403. Protruding from rod 403 are two smaller rods 405 and 407. Rod 403 fits into a cylindrical hole in the solderability testing machine, thus providing support for holder 22. Rods 407 and 405 fit into corresponding slots in the solderability testing machine, thus insuring that sample 12 remains horizontal in holder 22 during testing. (Similar attachment is shown in FIG. 3.)

We claim:

1. An apparatus for holding a sample for immersion into a solder bath comprising:
    a clamping mechanism having a first rod;
    a spring circumscribing said first rod;
    a first flat plate member, said first flat plate member defining a plane, said plane being generally perpendicular to the longitudinal axis of a first end of said first rod,
    a second flat plate member parallel to said first flat plate member, whereby said spring, when compressed, urges said first flat plate member toward said second flat plate member;
    and including means attatched to said clamping mechanism for making electrical contact with said solder bath.

2. The apparatus of claim 1 further including means connected to said first plate for suspending said apparatus from a solderability testing apparatus.

3. The apparatus of claim 2 wherein said means for suspending includes a second rod dimensioned to fit into said solderability tester, said second rod having at least one transverse third rod protruding therefrom.

4. The apparatus of claim 1 wherein both said first and second plates have an indentation dimensioned to receive said sample.

5. The apparatus of claim 1 wherein said first plate has four arms, the end of each arm having fingers which contact the corners of said sample.

6. The apparatus of claim 5 further including a perpendicular protrusion on said first rod, and including a collar surrounding said first rod with at least two openings dimensioned to receive said protrusion, whereby said first rod may be rotated within said collar to at least two fixed positions.

7. A method for evaluating the solderability of a sample comprising:
    inserting said sample in a apparatus having:
    a clamping mechanism with a first rod;
    a spring circumscribing said first rod;
    a first flat plate member, said first flat plate member defining a plane, said plane being generally perpendicular to the longitudinal axis of a first end of said first rod and contacting said sample;
    a second plate member parallel to said first flat plate member, whereby said spring when compressed urges said first flat plate member toward said second flat plate member;
    dipping said sample in said apparatus into a solder bath; and
    measuring the wetting force of said solder upon said sample.

8. The method of claim 7 wherein said apparatus further includes means connected to said first plate for suspending said apparatus from a solderability testing apparatus.

9. The method of claim 8 wherein said means includes a second rod dimensioned to fit into said solderability tester, said second rod having at least one transverse third rod protruding therefrom.

10. The method of claim 7 wherein both said first and second plates have an indentation dimensioned to receive said sample.

11. The method of claim 7 wherein said first plate has four arms, the end of each arm having fingers dimensioned to grasp the corners of said sample.

12. The method of claim 7 wherein said apparatus further includes a perpendicular protrusion on said first rod, and includes a collar surrounding said first rod with at least two openings dimensioned to receive said protrusion, whereby said first rod may be rotated within said collar to at least two fixed positions so that at least two sides of said sample may be tested without removing said sample from said apparatus.

13. The method of claim 7 wherein one side of said sample is evaluated and then the sample is rotated within said apparatus by rotation of said first rod and then another side of said sample is evaluated.

* * * * *